(12) United States Patent
Conti et al.

(10) Patent No.: US 10,589,849 B2
(45) Date of Patent: Mar. 17, 2020

(54) TRIM TAB RETENTION SYSTEM, AN AIRCRAFT EMPLOYING SAME AND A METHOD OF RETAINING A TRIM TAB WITHIN A BLADE HOUSING

(71) Applicant: Sikorsky Aircraft Corporation, Stratford, CT (US)

(72) Inventors: Timothy James Conti, Shelton, CT (US); David N. Schmaling, Southbury, CT (US); Leon M. Meyer, Harwinton, CT (US); Yih-Fam Chen, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 797 days.

(21) Appl. No.: 15/136,077

(22) Filed: Apr. 22, 2016

(65) Prior Publication Data
US 2017/0341743 A1 Nov. 30, 2017

Related U.S. Application Data

(60) Provisional application No. 62/152,329, filed on Apr. 24, 2015.

(51) Int. Cl.
*B64C 27/473* (2006.01)
*B64C 27/10* (2006.01)
*B64C 27/467* (2006.01)

(52) U.S. Cl.
CPC ............ *B64C 27/473* (2013.01); *B64C 27/10* (2013.01); *B64C 27/467* (2013.01)

(58) Field of Classification Search
CPC ..... B64C 27/46; B64C 27/467; B64C 27/473; B64C 27/028; B64C 27/615; B64C 27/48
See application file for complete search history.

(56) References Cited

U.S. PATENT DOCUMENTS

| | | | | |
|---|---|---|---|---|
| 2,760,588 A | * | 8/1956 | Zeerip | B64C 27/46 264/331.13 |
| 3,055,437 A | * | 9/1962 | Stack | B64C 27/473 416/144 |
| 3,217,807 A | * | 11/1965 | Underhill, Jr. | B64C 27/473 416/226 |
| 3,455,757 A | * | 7/1969 | Ford | B29D 99/0025 156/214 |
| 4,188,171 A | * | 2/1980 | Baskin | B64C 27/473 416/145 |
| 6,322,324 B1 | * | 11/2001 | Kennedy | B64C 27/001 244/17.13 |

(Continued)

*Primary Examiner* — Michael H Wang
(74) *Attorney, Agent, or Firm* — Cantor Colburn LLP

(57) ABSTRACT

A trim tab for use in a blade housing includes a cavity connected to an opening extending from the cavity out a trailing edge of the blade housing, the cavity has a first dimension which is greater than a second dimension of the opening at a same spanwise location of the blade housing. The trim tab has a trim portion, a head portion having a head dimension substantially similar to the first dimension, and a tail portion connecting the trim portion and the head portion. The tail portion has a tail dimension substantially similar to the second dimension such that the trim tab is retainable by the blade housing when the head portion is disposed within the cavity and the tail portion is disposed within the opening.

13 Claims, 3 Drawing Sheets

(56) References Cited

U.S. PATENT DOCUMENTS

| | | | | |
|---|---|---|---|---|
| 6,942,455 B2* | 9/2005 | Schmaling | ............ | F01D 5/005 |
| | | | | 244/11 |
| 7,083,383 B2* | 8/2006 | Loftus | ............ | B64C 27/008 |
| | | | | 416/132 R |
| 8,043,053 B2* | 10/2011 | Bernhard | ............ | B64C 27/615 |
| | | | | 415/148 |
| 8,932,024 B2* | 1/2015 | Hayashi | ............ | F03D 1/0608 |
| | | | | 416/228 |
| 2009/0162199 A1 | 6/2009 | Bernhard | | |
| 2009/0290982 A1* | 11/2009 | Madsen | ............ | F03D 1/0633 |
| | | | | 416/61 |
| 2010/0181415 A1* | 7/2010 | Altmikus | ............ | B64C 27/473 |
| | | | | 244/17.11 |
| 2012/0207602 A1* | 8/2012 | Matalanis | ............ | B64C 27/615 |
| | | | | 416/131 |

\* cited by examiner

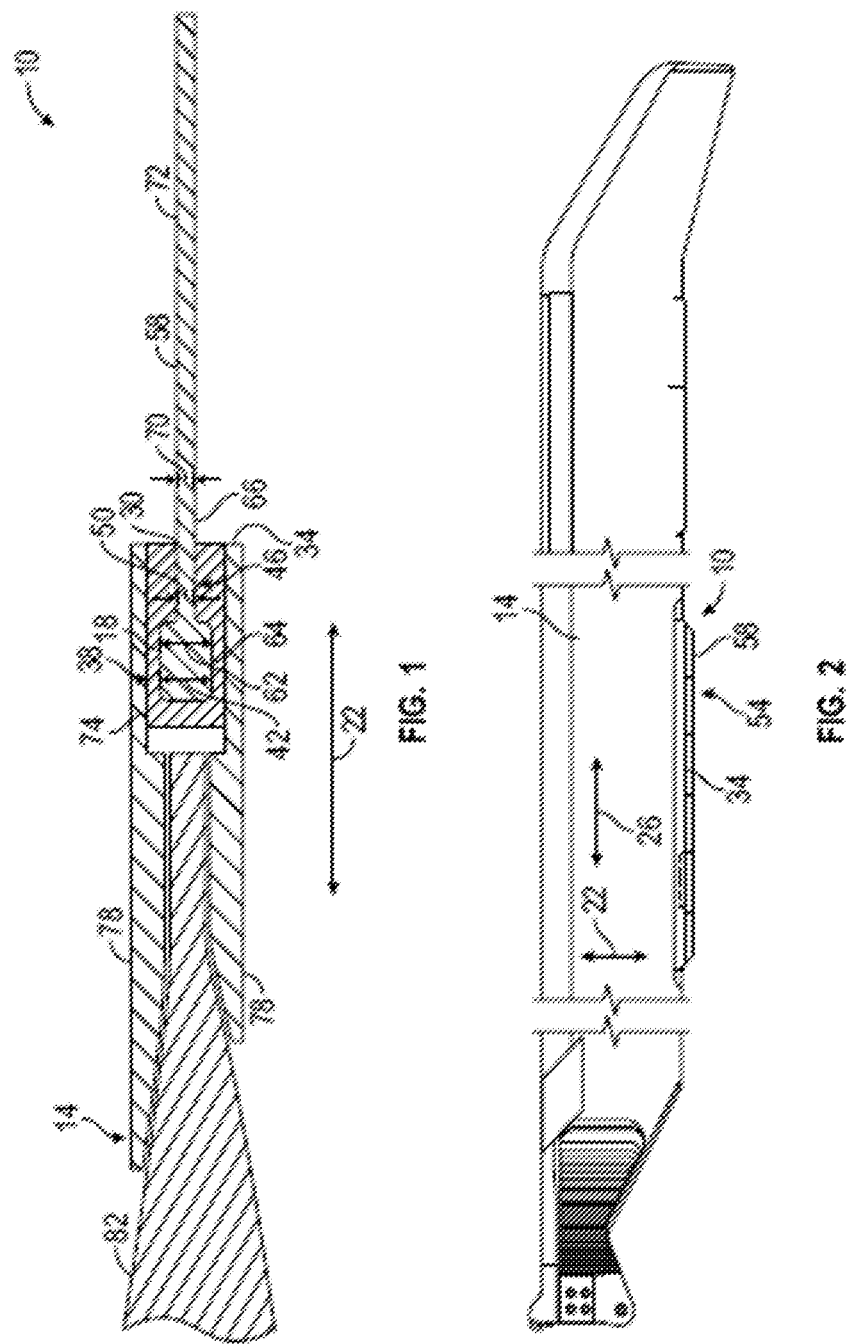

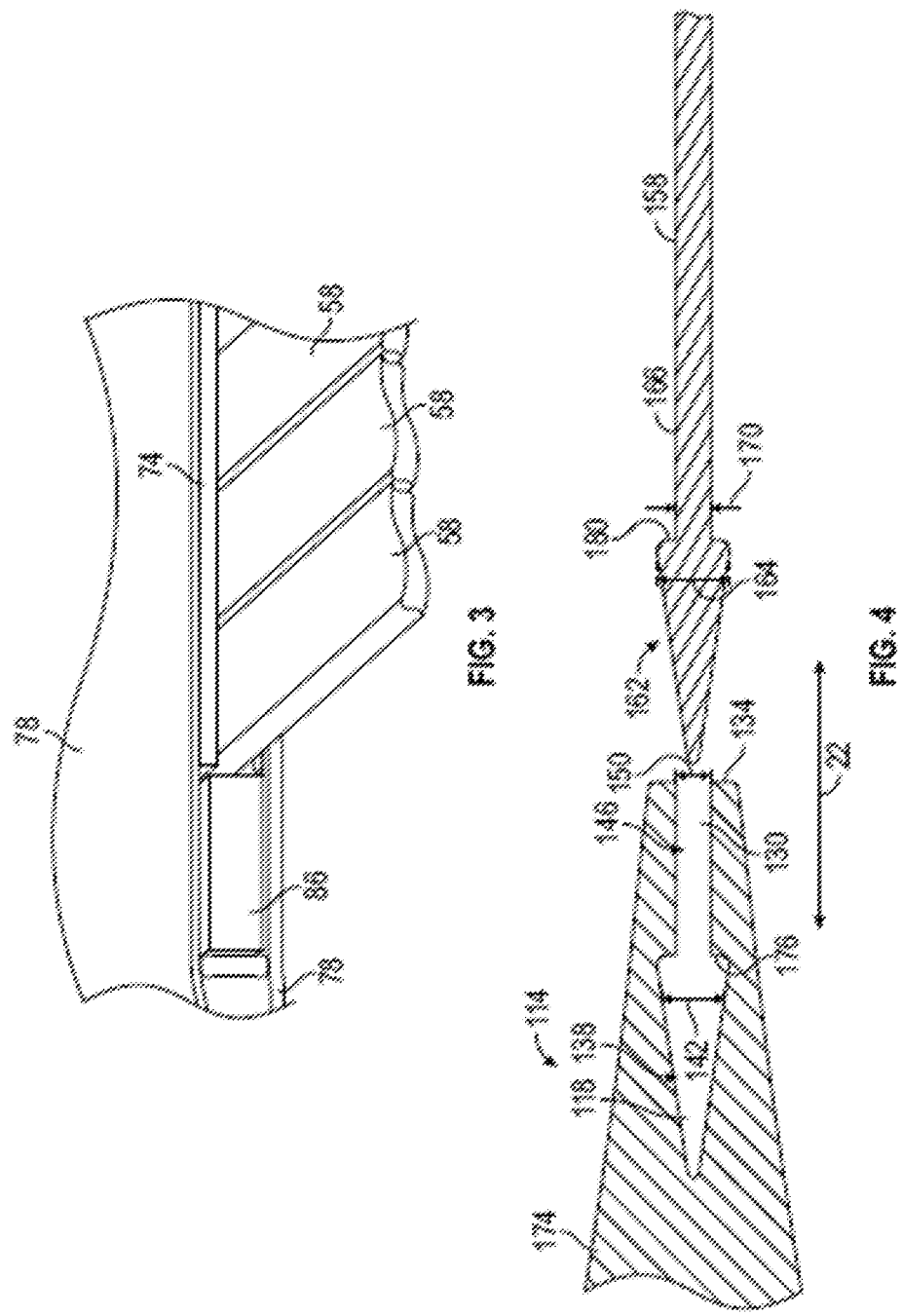

TRIM TAB RETENTION SYSTEM, AN AIRCRAFT EMPLOYING SAME AND A METHOD OF RETAINING A TRIM TAB WITHIN A BLADE HOUSING

This application claims priority to provisional U.S. Patent Application Ser. No. 62/152,329 filed on Apr. 24, 2015, the disclosure of which is incorporated by reference herein in its entirety.

BACKGROUND

Embodiments herein generally relate to aircrafts and, more particularly, to a trim tab retention system in the main rotors of the aircraft.

Helicopter main rotor blades typically have a trim tab at the trailing edge of the blades. The trim tabs are often made of aluminum and are permanently bonded to the trailing edge of the blade. The trim tabs are permanently bent as part of the track and balance procedures of the aircraft. The trim tab on each of the blades is typically bent differently from the other trim tabs to minimize blade to blade differences in order to minimize vibrations induced by dissimilarity of the blades. Adjustable trim tabs may need to be replaced from time to time. Systems and methods to reduce the need for such replacement and to facilitate such replacement when needed will be well received in the art.

BRIEF DESCRIPTION

According to one embodiment of the invention, a trim tab for use in a blade housing including a cavity connected to an opening extending from the cavity out a trailing edge of the blade housing, the cavity having a first dimension which is greater than a second dimension of the opening at a same spanwise location of the blade housing, the trim tab comprising, a trim portion, a head portion having a head dimension substantially similar to the first dimension, and a tail portion connecting the trim portion and the head portion, the tail portion having a tail dimension substantially similar to the second dimension such that the trim tab is retainable by the blade housing when the head portion is disposed within the cavity and the tail portion is disposed within the opening.

In addition to one or more of the features described above, or as an alternative, in further embodiments the head dimension prevents the head portion from moving through the second dimension in a chordwise direction of the blade housing during operation.

In addition to one or more of the features described above, or as an alternative, in further embodiments the head portion is tapered in a direction away from the tail portion to cause the second dimension of the opening to temporarily increase when the head portion is moved through the opening into the cavity.

In addition to one or more of the features described above, or as an alternative, in further embodiments the at least one trim tab is metal.

In addition to one or more of the features described above, or as an alternative, in further embodiments the at least one trim tab is aluminum.

In addition to one or more of the features described above, or as an alternative, in further embodiments a retainer portion comprising the cavity, the retainer portion comprises a material that isolates strain from the at least one trim tab.

In addition to one or more of the features described above, or as an alternative, in further embodiments a retainer portion comprising the cavity, the retainer portion comprises a member made of fibers of carbon or glass in an epoxy resin.

In addition to one or more of the features described above, or as an alternative, in further embodiments the cavity is formed in a member made of titanium.

In addition to one or more of the features described above, or as an alternative, in further embodiments the at least one trim tab is a plurality of trim tabs oriented adjacent one another in a spanwise direction.

In addition to one or more of the features described above, or as an alternative, in further embodiments the at least one trim tab is removable from the cavity by first moving the at least one trim tab spanwise relative to the blade housing to an area wherein the cavity without the second such that the head portion can be moved out of the cavity in a chordwise direction.

In addition to one or more of the features described above, or as an alternative, in further embodiments the head portion is tapered toward the tail portion to cause the second dimension to temporarily increase when the head portion is moved therethrough.

According to one embodiment of the invention a method or retaining a trim tab within a blade housing, includes retaining a trim tab within a blade housing, comprising, positioning a head portion of a trim tab within a first portion of a cavity in the blade housing, and positioning a tail portion of the trim tab within a second portion of the cavity, the first portion having a first dimension and the second portion having a second dimension wherein the first dimension and the second dimension are orthogonal to both a spanwise and a chordwise direction of the blade housing, the first dimension being larger than the second dimension such that the trim tab is retained within the blade housing with a head dimension of the head portion being larger than the second dimension.

According to one embodiment of the invention an aircraft comprising, a fuselage, an engine in operable communication with the fuselage, and a rotor assembly in operable communication with the engine having at least one blade comprising a trim tab described above.

In addition to one or more of the features described above, or as an alternative, in further embodiments the first dimension and the second dimension are oriented in a direction of lift for the blade relative to the aircraft.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 1 depicts a cross sectional view of a trim tab retention system disclosed herein;

FIG. 2 depicts a top view of a blade housing that includes the main rotor trim tab retention system of FIG. 1;

FIG. 3 depicts a partial perspective view of the trim tab retention system of FIG. 1;

FIG. 4 depicts a partial cross sectional view of an alternate embodiment of a portion of a trim tab retention system disclosed herein.

DETAILED DESCRIPTION

Figure 5:
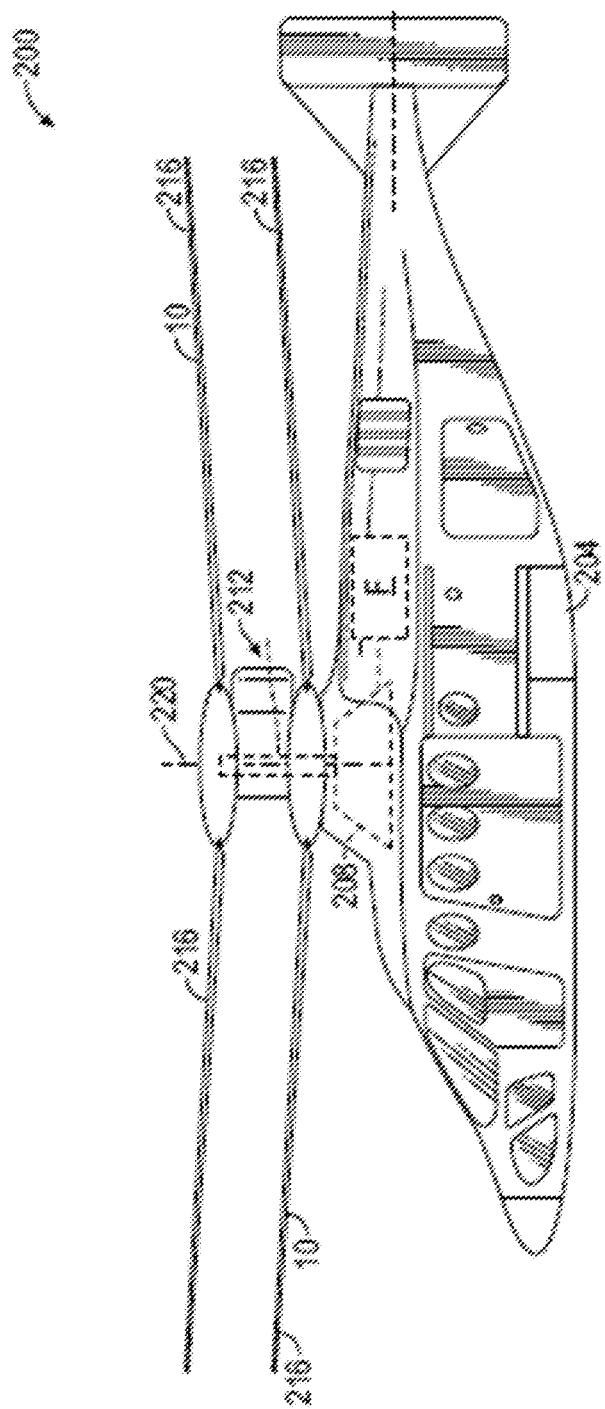
FIG. 5 depicts an aircraft employing the main rotor trim tab retention system of FIG. 1.

Referring to FIGS. 1 and 2, an embodiment of a trim tab retention system 10 includes a blade housing 14, a cavity 18 in the blade housing 14 extending chordwise along arrows 22 and spanwise along arrows 26 within the blade housing 14, and at least one trim tab 58 connected to the blade housing 14 using the cavity 18. The cavity 18 has an opening 30 extending from the cavity out a trailing edge 34 of the blade housing 14. The cavity 18 also has at least a first portion 38 with a first dimension 42 and a second portion 46 with a second dimension 50 that are both at a same spanwise location (see arrow 54, for example) of the blade housing 14. The first dimension 42 and the second dimension 50 are oriented orthogonally to the chordwise 22 and spanwise 26 directions and the first dimension 42 is larger than the second dimension 50. Also, the second dimension 50 is positioned nearer to the opening 30 than the first dimension 42. Each trim tab 58 has a head portion 62 with a head dimension 64 and a tail portion 66 with a tail dimension 70. A tail portion 66 connects the head portion 62 with a trim portion 72. The trim tab 58 is retainable by the blade housing 14 when the head portion 62 is disposed within the cavity 18 at the first portion 38 and the tail portion 66 is disposed within the cavity 18 at the second portion 46, and the head dimension 64 is larger than the second dimension 50. While six trim tabs 58 are illustrated, it is understood that embodiments could include a single trim tab 58, or other numbers of trim tabs 58. Further, while the trailing edge 34 of the blade housing 14 having cavity 18 is shown substantially parallel with the spanwise direction 26, it is understood that aspects of the invention could include the trailing edge 34 not being parallel with the spanwise direction 26, in which embodiments the cavity 18 could extend substantially parallel with the trailing edge or with the spanwise direction 26.

The sizing of components in the foregoing structure as well as material selected for the various components prevent the head portion 62 from being able to be withdrawn from the blade housing 14 directly in the chordwise 22 direction. The trim tab 58 may be made of a material that can adjusted through plastic deformation such as bending, for example, to a desired shape where it will remain during operational use. Such materials include metals such as aluminum, for example.

According to an aspect of the invention, at least a retainer portion 74 of the blade housing 14 that includes the cavity 18 comprises materials and geometries to isolate the trim tab 58 from strain exhibited in the blade housing 14. The materials have physical properties whereby strain exerted on the trim tab 58 during its operational life should be maintainable at levels sufficiently low to avoid failure of the trim tab 58 through mechanisms such as bending and fatigue, for example. While not limited thereto, materials suitable for the portion 74 include fibers of carbon or glass in an epoxy resin, such as Lytex™, for example, as well as materials such as titanium. Use of a dry film lube or a layer of Polytetrafluoroethylene (PTFE) such as, Teflon™, for example, between the portion 74 and the trim tab 58 can be used to prevent fretting between of both the trim tab 58 and the portion 74. Other parts 78, referred to hereunder as doublers are employed to fixedly attach the portion 74 to a blade member 82 of the blade housing 14. Attachment of the portion 74 to the doublers 78 can be via adhesive, fasteners or other mechanisms. The doublers 78 may be made of a nonmetallic composite material and can be adhered to a rotor blade member 82 via an adhesive, fasteners or other mechanisms.

Referring to FIG. 3, the trim tabs 58 are removable from the cavities 18 in the blade housing 14 without damaging the blade housing 14. Doing so in one embodiment includes removing a plug 86 that is removably positionable adjacent to one of the trim tabs 58 in a spanwise 26 direction. The plug 86 is positionable within a spanwise 26 portion of the cavity 18 that does not have the second portion 46 with the reduced second dimension 50. As such, once the plug 86 has been removed, one or more of the trim tabs 58 can be removed from the cavity 18 by sliding each of the trim tabs 58 spanwise 26 to the position where the plug 86 was positioned and then moving the trim tab 58 chordwise 22 and out the trailing edge 34 of the blade housing 14. It should be noted that the plug 86 could be positioned adjacent to the trim tabs 58 in either spanwise 26 direction. Repaired or replaced trim tabs 58 can be installed back into the cavity 18 by reversing the foregoing steps.

Referring to FIG. 4, an alternate embodiment of a portion of a trim tab retention system is illustrated. To avoid being redundant, only the portions that differ from the system 10 are illustrated. Specifically shown is a portion 174 of a blade housing 114 having a cavity 118 and a trim tab 158 retainable in the cavity 118. The cavity 118 has an opening 130 extending from the cavity 118 out a trailing edge 134 of the blade housing 114. The cavity includes a first portion 138 having a first dimension 142 and a second portion 146 having a second dimension 150. The first dimension 142 being larger than the second dimension 150. The trim tab 158 includes a head portion 162 having a head dimension 164 and a tail portion 166 including a tail dimension 170. The portion 174 is sufficiently elastically deformable to allow the second dimension 150 to be temporarily increased to permit the head portion 162 of the trim tab 158 to pass through the second portion 146 and into the first portion 138 via movement of the trim tab 158 in the chordwise 22 direction relative to the portion 174. Once the head portion 162 has passed the second portion 146 the second portion 146 is reduced back toward, or all the way to, the original second dimension 150, thereby locking the head portion 162 within the cavity 118. After such locking, geometrical parameters involved with a shoulder 176 on the second portion 146 being contactable with a shoulder 180 on the trim tab 158 prevent forces from being generated during operation that could flex the second portion 146 sufficiently to permit the head portion 162 to pass back through the second portion 146. Thereby providing retention of the trim tab 158 to the blade housing 114 without relying on an adhesive in the process, while still permitting removal of the trim tabs 158 from the blade housing 114 without damaging the blade housing 114.

Although the embodiment illustrated in FIG. 4 employs a portion 174 that is sufficiently elastically flexible to allow the second portion 146 to temporarily spread the allow the head portion 162 of the trim tab 158 to pass therethrough other embodiments are contemplated including spring loaded hinges (not shown) that would allow temporary increases in the second dimension 150.

Referring to FIG. 5, an embodiment of an aircraft 200 employing the trim tab retention system 10 is illustrated. The aircraft 200 includes a fuselage 204 housing an engine 208. A rotor assembly 212 includes a plurality of main rotor blades 216 that are rotationally controlled by the engine 208 to rotate about an axis 220 that is substantially vertical in the Figure. Each of the blades 216 includes at least one of the trim tab retention systems 10 disposed at a trailing edge 34 (also in FIGS. 1 and 2) thereof. Although the aircraft 200 of the embodiment shown is a helicopter having two sets of the blades 216 it should be understood that alternate embodiments of the aircraft 200 are contemplated that have other numbers of the blades 216 as well as fixed wing aircraft. Additionally, the trim tab retention system 10 disclosed herein can also be used in other industries including propellers on coaxial or fixed wing aircraft, propellers in maritime applications, wind turbine blade applications, and other applications where trim tabs are used or are usable.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of retaining a trim tab within a blade housing, comprising:
    providing a blade housing having a cavity including a first portion having a first dimension and a second portion having a second dimension, wherein the first dimension and the second dimension are orthogonal to both a spanwise and a chordwise direction of the blade housing;
    elastically deforming a portion of the blade housing to permit a head portion of the trim tab to pass through the second portion of the cavity;
    positioning the head portion of a trim tab within the first portion of the cavity in the blade housing; and
    positioning a tail portion of the trim tab within the second portion of the cavity, wherein the first dimension is larger than the second dimension such that the trim tab is retained within the blade housing with a head dimension of the head portion being larger than the second dimension.

2. An aircraft comprising:
    a fuselage;
    an engine in operable communication with the fuselage; and
    a rotor assembly in operable communication with the engine having at least one rotor blade, the rotor blade including a blade housing having a cavity connected to an opening extending from the cavity out a trailing edge of the blade housing, the cavity having a first dimension which is greater than a second dimension of the opening at a same spanwise location of the blade housing; and
    a trim tab including a trim portion, a head portion having a head dimension substantially similar to the first dimension, and a tail portion connecting the trim portion and the head portion, the tail portion having a tail dimension substantially similar to the second dimension such that the trim tab is retainable by the blade housing when the head portion is disposed within the cavity and the tail portion is disposed within the opening;
    wherein the blade housing is elastically deformable to permit the head portion to pass through the second portion of the cavity.

3. The aircraft of claim 2, wherein the first dimension and the second dimension are oriented in a direction of lift for the blade relative to the aircraft.

4. The aircraft of claim 2, wherein the head dimension prevents the head portion from moving through the second dimension in a chordwise direction of the blade housing during operation.

5. The aircraft of claim 2, wherein the head portion is tapered in a direction away from the tail portion to cause the second dimension of the opening to temporarily increase when the head portion is moved through the opening into the cavity.

6. The aircraft of claim 2, wherein the at least one trim tab is metal.

7. The aircraft of claim 2, wherein the at least one trim tab is aluminum.

8. The aircraft of claim 2, further comprising a retainer portion comprising the cavity, the retainer portion comprises a material that isolates strain from the at least one trim tab.

9. The aircraft of claim 2, further comprising a retainer portion comprising the cavity, the retainer portion comprises a member made of fibers of carbon or glass in an epoxy resin.

10. The aircraft of claim 9, wherein the at least one trim tab is a plurality of trim tabs oriented adjacent one another in a spanwise direction.

11. The aircraft of claim 9, wherein the at least one trim tab is removable from the cavity by first moving the at least one trim tab spanwise relative to the blade housing to an area of the cavity such that the head portion can be moved out of the cavity in a chordwise direction.

12. The aircraft of claim 9, wherein the head portion is tapered toward the tail portion to cause the second dimension to temporarily increase when the head portion is moved therethrough.

13. The aircraft of claim 2, further comprising a retainer portion comprising the cavity, the retainer portion comprises a member made of titanium.

* * * * *